Figure 1:
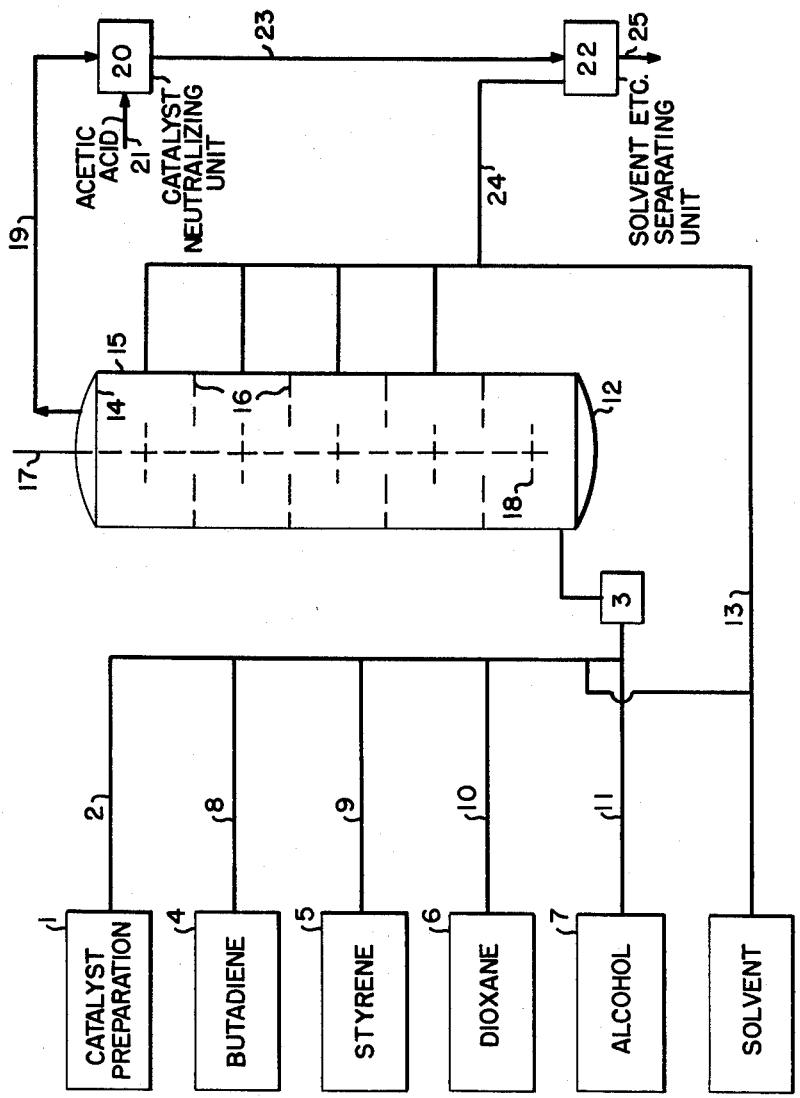

Clarence Martin Eidt, Jr.
John Dana Koontz  Inventors

By C. D. Stores

Patent Attorney

United States Patent Office 3,093,695
Patented June 11, 1963

3,093,695
PROCESS FOR PREPARING LIQUID COPOLYMERS OF BUTADIENE AND STYRENE
Clarence Martin Eidt, Jr., Plainfield, N.J., and John Dana Koontz, Baton Rouge, La., assignors to Esso Research and Engineering Company, a corporation of Delaware
Filed Oct. 3, 1960, Ser. No. 60,161
5 Claims. (Cl. 260—669)

This invention relates to a continuous process for the preparation of liquid polymers of a diolefin, such as butadiene, in the presence of an alkali metal catalyst. More particularly it relates to a method for improving the ease with which the alkali metal catalyst can be removed from the final product.

The polymerization of conjugated diolefins, such as 1,3-butadiene with or without comonomers, such as a vinyl aromatic hydrocarbon, e.g., styrene, in the presence of an alkali metal catalyst in the presence or absence of a solvent is well known. Solid or liquid products may be produced using these catalysts. Liquid products are favored by the use of a solvent, moderate temperatures and small amounts of finely dispersed catalyst in a system in which the feed materials are continuously introduced into a staged reactor and product is withdrawn from the final stage. Such a process is described in U.S. Patent 2,849,510, issued August 26, 1958, to Stanley E. Jaros and Joseph F. Nelson. A modification of this process is described in U.S. Patent 2,791,618, issued May 7, 1957, to James E. Moise and Marnell A. Segura.

One of the major difficulties encountered in the commercialization of such a continuous process is the removal of the catalyst from the final product. This catalyst can be removed by contacting the effluent from the last stage with acetic acid as described in U.S. Patent 2,714,620 to Robert F. Leary, issued August 2, 1955, or with sulfuric acid as described in U.S. Patent 2,712,561, issued July 5, 1955, to Anthony H. Gleason. However, a method more adaptable to a continuous process is that described in U.S. Patent 2,862,982, issued December 2, 1958, to Neville L. Cull et al., in which the effluent is filtered through clays containing 1–25% bound water. The ease with which the catalyst is removed from the product passing through the clay is dependent upon the form in which the catalyst exists. Although the actual condition of the catalyst is not known, it is presumed that the catalyst may become complexed with the polymer product and in that condition will more easily pass through the clay than catalyst particles which are not so complexed.

Regardless of the mechanism by which the catalyst is or is not retained by the clay it has now been found that the efficiency of the catalyst retention on the clay is dependent upon the conditions prevailing in the reaction zone. These conditions are low conversion in the first stage and low holding time in each stage.

It is therefore the main object of this invention to provide a process for the production of liquid polymers of conjugated diolefins by the polymerization of such diolefins in the presence of an alkali metal catalyst under such conditions that the catalyst is maintained in an easily filterable form in the reactor effluent.

It is another object of this invention to provide a process by which the catalyst is most easily removed from a conjugated diolefin polymer product.

It is a further object to provide improvements in the multistage continuous alkali-metal-catalyzed copolymerization of butadiene-1,3 and styrene.

A still further object is to provide a liquid polybutadiene or liquid copolymer of butadiene and styrene having improved characteristics.

These and other objects of this invention are accomplished by minimizing the contact time between the catalyst and the polymer product. This minimum contact is realized by maintaining the conversion in the first stage between 10 and 30% and by maintaining the holding time in each stage at not over four hours. The temperature should be maintained between 50 and 100° C. in each stage and the pressure between 0 and 60 p.s.i.g. The amount of catalyst should be low, not over 2.0%, based on monomers, preferably between 1.0 and 1.5%, and should have an average particle size below 200 microns; e.g., between 1 and 100 microns. While the only diluents necessarily present in the first stage are those introduced with the catalyst dispersion, the ether modifier and the alcohol catalyst activator, additional diluent should be present to enable the viscosity of the product to be within a workable range. The monomers at the onset of the reaction are miscible with each other and with the ether and alcohol and the small amount of solvent introduced with the catalyst. This is sufficient to insure contact of the reactants and to dissolve the initial polymer formed. In later stages of the process as the amount of polymer builds up and the viscosity of the system increases, more solvent can be added, if desired. The total quantities of solvent added may be within the range of 300 to 500 parts of solvent per 100 parts of monomers. A suitable solvent is any hydrocarbon liquid boiling between 20 and 250° C.

In a specific embodiment of this invention, a plurality of vessels are used as reactors. Each vessel is equipped with an agitator and inlets for the introduction of reactants, solvent and catalyst. The initial charge is introduced to the first vessel in the series and the product is withdrawn from the last. In the initial vessel the catalyst, monomers, solvent, modifier, catalyst activator are introduced. Additional amounts of solvent may be introduced into the second and/or succeeding vessels in the series. The polymer solution withdrawn from the final stage is fed to a polymer separation system where the catalyst is removed from the crude reaction product by filtration through Attapulgus clay or other clay containing 1 to 25% bound water. The catalyst-free product is then treated to remove the solvent, modifiers, etc., which are recycled to the reactor.

In order to illustrate a specific embodiment of the process of this invention, reference is had to FIGURE 1, which is a diagrammatic representation of one method of carrying out this invention. In the description reference is had to specific comonomers and also to a specific design and arrangement of equipment. It is to be understood, however, that variations in both materials and equipment may be made without departing from the scope of the disclosure.

A finely divided suspension of alkali metal catalyst, for example, sodium in Varsol, from catalyst preparation vessel 1, is introduced by line 2 into mixer 3. Simultaneously butadiene or other conjugated diolefin from tank 4, styrene or other vinyl aromatic hydrocarbon from tank 5, dioxane or diethyl ether or other ether from tank 6 and isopropyl or other alcohol from tank 7 are passed by lines 8, 9, 10 and 11, respectively, into mixer 3 and introduced into the lowermost stage of reactor 12. Varsol solvent from line 13 is introduced to each of the second and succeeding stages of the reactor as needed.

The reactor itself consists of a large vessel 14 surrounded by cooling jacket 15 and divided into five stages by means of horizontal baffles 16. A vertical shaft 17 bearing blades 18 is disposed centrally of vessel 14 as an agitator. Polymerization occurs in reactor 12 at a temperature between 50 and 100° C. and the polymer solution passes from stage to stage by overflowing between the baffles 16. The polymer solution passes from the reactor by line 19 to a sodium removal section 20. This is accomplished by passing the polymer solution through a bed of Attapulgus clay or preferably through a rotary filter, such as the Oliver filter, coated with the clay as described in U.S. Patent 2,862,982, supra. The filtered polymer solution is then fed to a separating unit 22 by line 23 where Varsol solvent, ether and alcohol are stripped off and recycled to the reactor through line 24. Liquid polymer is removed through line 25 and is ready for further processing.

By following the process as described above, 100 parts by wt. of a conjugated diolefin, such as butadiene-1,3 or a mixture of 50 to 95 parts by wt. of said diolefin and 50 to 5 parts by wt. of styrene may be polymerized in a multistage once-through continuous process in the presence of a finely divided alkali metal catalyst, such as sodium, potassium, lithium, caesium or rubidium.

The diluents suitable for use in this invention are essentially aliphatic hydrocarbons, such as naphtha (boiling 90 to 120° C.) or straight-run mineral spirits such as Varsol (boiling 150–200° C.) but butane, pentane, benzene, toluene, xylene, cyclohexane, butenes, pentenes, Solvesso 100 (a mixture of aromatic hydrocarbons boiling 150 to 175° C.), Solvesso 150 (a mixture of aromatic hydrocarbons boiling 190 to 210° C.) or similar inert hydrocarbons are also usable, alone or in admixture. It is also desirable to include a substantial amount of certain ethers having 2 to 8 carbon atoms as codiluents or reaction modifiers. Suitable ethers include aliphatic ethers, such as diethyl ether, vinyl isobutyl ether, and cyclic ethers such as dioxane-1.4 and other cyclic ethers having the oxygen atoms separated by at least two carbon atoms. While the use of these ethers is desirable they are not indispensable to the reaction. Their presence enables a more reproducible product to be obtained and also results in the preparation of a very light or almost colorless product. When color is no problem these ethers may be omitted. The ethers, when used, are employed in amounts ranging from about 1 to 100 parts, preferably 5 to 50 parts, by wt. per 100 parts of monomers.

It is also advantageous to use about 10 to 50%, preferably 10 to 30 wt. percent (based on catalyst) of a $C_2$ to $C_5$ alcohol in the recipe, e.g., ethanol, isopropanol, isobutanol, isopentanol, secondary butanol and tertiary butanol.

The reaction time and introduction period vary depending on the degree of catalyst dispersion, reaction temperature, purity of feed materials and whether or not an ether and/or an alcohol are present during polymerization. The catalyst particle size should be about 1 to 100, preferably 20–40 microns. It is usually fed to the reactor as a slurry in 2 to 200 parts by wt. of a hydrocarbon diluent, which may or may not be the same as the reaction diluent.

In accordance with this invention the process is initiated by charging the first stage of the reactor with the monomers, catalyst and modifiers and only enough diluent to give a workable solution and batch reacting the charge until the reaction has reached a conversion level of about 20%. The continuous addition of monomers, solvent, modifiers and catalyst are then begun and the reaction continued for only a short time; i.e., until conversion has built up to about 30%. This means that the holding time in this stage will be low—not over 4 hrs., preferably 0.5 to 2 hrs. For subsequent stages it may range from 2 to 4 hrs. The contents of the first stage are then allowed to flow continuously to the second stage where additional diluent is added, if desired. Additional styrene modifier and catalyst may be added also, if desired. The reaction continues in stage two and flows continuously to as many stages as desired.

The process as described thus affords a means for assuring minimum contact between the catalyst and the polymerization product which in turn results in a product from which the catalyst can be easily removed. Care should be taken to filter the reactor effluent through the clay as soon as possible after its withdrawal from the last stage of the reactor because it has been observed that polymer which has been stored for any length of time before removing the catalyst, is much more difficult to filter and produce a catalyst-free product.

The product of the invention is a solution of polymer in a hydrocarbon diluent and is, depending on the amount and type of ether used and the amount of diluent used in the various stages of the process, a clear, colorless to light yellow oil which has a viscosity of 1.0 to 22.0 poises at 50% N.V.M., preferably 1.5 to 3.0 poises.

*Example 1*

A series of continuous runs were made over a period of 2 to 3 months in a commercial unit provided with a large reaction vessel divided by horizontal baffles into a five-stage unit. In these runs a mixture of 80% butadiene-1.3 and 20% styrene was introduced into the first stage together with 30 parts of dioxane, 0.3 part of isopropyl alcohol, 90 parts Varsol and about 2 parts sodium, all based on monomers. Conversion was varied from 20 to 90 wt. percent in the first stage and hold up time in each of the stages was maintained below four hours. The poduct from the last stage was filtered through Attapulgus clay and the amount of sodium remaining in the filtrate was determined. The following data were obtained:

| Conversion, weight percent first stage | Sodium in filtrate, p.p.m. |
| --- | --- |
| 22 | 5 |
| 32 | 30 |
| 40 | 35 |
| 50 | 60 |
| 66 | 95 |
| 71 | 220 |
| 85 | 320 |
| 85 | 172 |
| 90 | 300 |
| 90 | 170 |

Figure 2:
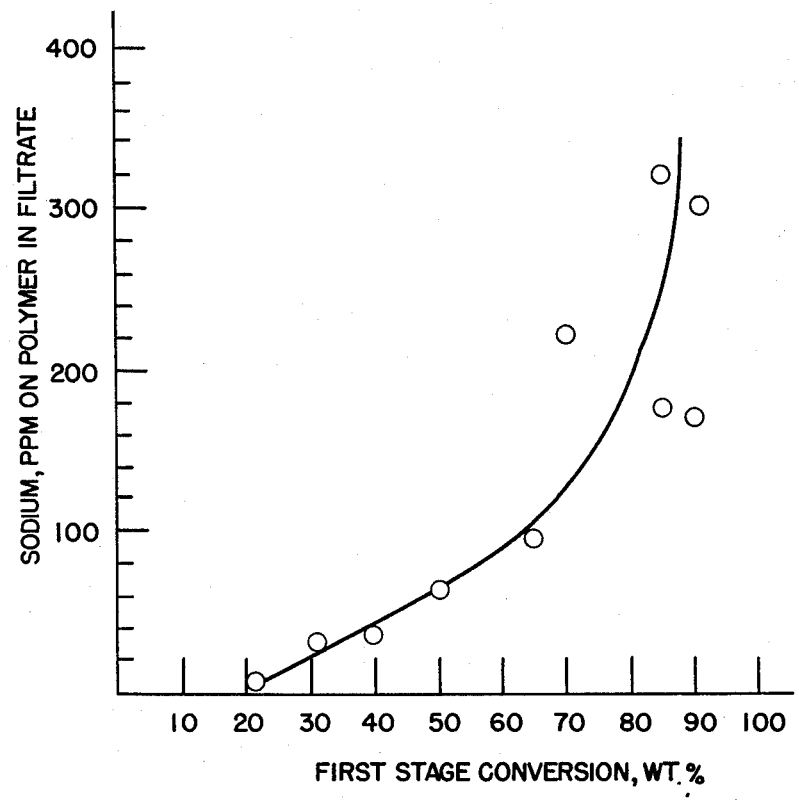

The above data are set forth graphically in FIGURE 2 and show clearly the direct dependence of sodium removal on the conversion level in the first stage of the reaction zone. Furthermore, the holding time in each stage should not be over four hours to avoid the complexing of the sodium with the product, a form in which the sodium easily passes through the clay.

The nature of the present invention having been thus fully set forth and specific examples of the same given, what is claimed as new and useful and desired to be secured by Letters Patent is:

1. A process for producing a crude liquid polymer oil containing catalyst in easily filterable form which comprises charging a mixture of 50 to 100 parts of a conjugated diolefin, 50 to 0 parts of a vinyl aromatic hydrocarbon, about 1 to 100 parts of an ether having 2 to 8 carbon atoms chosen from the group consisting of alkyl ethers and cyclic diethers having the oxygen atoms separated by at least two carbon atoms and about 1.0 to 2 parts by wt. of finely divided alkali metal catalyst, all based on monomers, to a first polymerization zone, maintaining a conversion of 10 to 30% in said first reaction zone at a temperature of 50 to 100° C., continuously passing the reactants after a residence time in said first reaction zone of 0.5 to 4 hr. to at least one additional reaction zone under similar temperature conditions and a residence time of 2 to 4 hrs. in each zone, and withdrawing polymer product containing catalyst in easily filterable form from the final reaction zone.

2. A process for preparing a polymer oil having low residual catalyst content which comprises charging a mixture of 50 to 100 parts of a conjugated diolefin, 50 to 0 parts of a vinyl aromatic hydrocarbon, about 1 to 100 parts of an ether having 2 to 8 carbon atoms chosen from the group consisting of alkyl ethers and cyclic diethers having the oxygen atoms separated by at least two carbon atoms and about 1.0 to 2 parts of finely divided alkali metal catalyst to a first polymerization zone, maintaining a conversion of 10 to 30 wt. percent in said first reaction zone at a temperature of 50 to 100° C., continuously passing the reactants after a residence time in said first reaction zone of 0.5 to 2 hr. to at least one additional reaction zone under similar temperature conditions and a residence time of 2 to 4 hrs. in each of said additional zones, withdrawing product containing residual catalyst from the final reaction zone, passing said product through a bed of clay containing 1 to 25% water, and withdrawing a final product substantially free of catalyst from said bed.

3. A process for producing a crude liquid polymer oil containing catalyst in easily filterable form which comprises charging a mixture of 50 to 100 parts by wt. of a conjugated diolefin, 50 to 0 parts of a vinyl aromatic hydrocarbon and about 1.0 to 2 parts by wt., based on monomers, of finely divided alkali metal catalyst to a first polymerization zone, maintaining a conversion of 10 to 30 wt. percent in said first reaction zone at a temperature of 50 to 100° C., continuously passing reactants after a residence time in said first reaction zone of 0.5 to 4 hr. to at least one additional reaction zone under similar temperature conditions and a residence time of 2 to 4 hrs. in each of said additional zones, and withdrawing product containing residual catalyst in easily filterable form from the final reaction zone.

4. In a multistage continuous process for the production of liquid polymers and copolymers of conjugated diolefins in which 50 to 100 parts by wt. of a conjugated diolefin, 50 to 0 parts by wt. of a vinyl aromatic hydrocarbon and about 1.0 to 2 parts by wt., based on monomers, of finely divided alkali metal catalyst is continuously introduced into the first stage of a multistage polymerization zone at a temperature of 50 to 100° C. and in which the reactants flow from stage to stage and polymer product containing residual alkali metal catalyst is withdrawn from the final stage and passes through a bed of clay containing 1 to 25 wt. percent of bound water, the method of improving the efficiency of the catalyst removal step which comprises maintaining the conversion of the diolefin and vinyl aromatic hydrocarbon in the first stage at a level between 10 and 30% whereby a polymer product containing residual catalyst in easily filterable form is obtained.

5. Process according to claim 4 in which 80 parts by wt. of butadiene-1,3 are copolymerized with 20 parts by wt. of styrene in the presence of sodium as the catalyst.

References Cited in the file of this patent
UNITED STATES PATENTS

| | | |
|---|---|---|
| 2,712,562 | Leary et al. | July 5, 1955 |
| 2,728,801 | Jaros et al. | Dec. 27, 1955 |
| 2,791,618 | Moise et al. | May 7, 1957 |
| 2,845,467 | Mertzweiller | July 29, 1958 |
| 2,849,510 | Jaros et al. | Aug. 26, 1958 |